US006222465B1

(12) United States Patent
Kumar et al.

(10) Patent No.: US 6,222,465 B1
(45) Date of Patent: Apr. 24, 2001

(54) GESTURE-BASED COMPUTER INTERFACE

(75) Inventors: Senthil Kumar; Jakub Segen, both of Monmouth, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/208,084

(22) Filed: Dec. 9, 1998

(51) Int. Cl.[7] ................................................. G09G 5/00
(52) U.S. Cl. .......................... 341/20; 345/156; 345/168; 345/173; 345/420; 382/100; 382/107
(58) Field of Search ............................ 341/20; 345/156, 345/168, 173, 420, 358; 382/100, 107; 73/865.4

(56) References Cited

U.S. PATENT DOCUMENTS

| | | | | |
|---|---|---|---|---|
| 4,843,568 | * | 6/1989 | Krueger | 382/100 |
| 5,319,747 | * | 6/1994 | Gerrissen | 345/349 |
| 5,563,998 | * | 10/1996 | Maes | 707/507 |
| 5,714,698 | * | 2/1998 | Tokioka | 73/865.4 |
| 5,767,842 | * | 6/1998 | Korth | 345/168 |
| 5,875,108 | * | 2/1999 | Hoffberg | 364/146 |
| 5,875,257 | * | 2/1999 | Marrin | 382/107 |
| 5,901,246 | * | 5/1999 | Hoffberg | 382/209 |
| 5,913,727 | * | 6/1999 | Ahdoot | 463/39 |
| 5,982,352 | * | 11/1999 | Pryor | 345/156 |
| 5,999,185 | * | 12/1999 | Kato | 345/420 |
| 6,028,593 | * | 2/2000 | Rosenberg | 345/156 |
| 6,111,580 | * | 8/2000 | Kazama | 345/168 |

* cited by examiner

Primary Examiner—Michael Horabik
Assistant Examiner—Albert K. Wong

(57) ABSTRACT

A system and method for manipulating virtual objects in a virtual environment, for drawing curves and ribbons in the virtual environment, and for selecting and executing commands for creating, deleting, moving, changing, and resizing virtual objects in the virtual environment using intuitive hand gestures and motions. The system is provided with a display for displaying the virtual environment and with a video gesture recognition subsystem for identifying motions and gestures of a user's hand. The system enables the user to manipulate virtual objects, to draw free-form curves and ribbons and to invoke various command sets and commands in the virtual environment by presenting particular predefined hand gestures and/or hand movements to the video gesture recognition subsystem.

31 Claims, 6 Drawing Sheets

GESTURE-BASED COMPUTER INTERFACE

BACKGROUND OF THE INVENTION

1. Field of the Invention

This invention pertains to a method and apparatus for inputting commands to a computer using hand gestures. More particularly, the present invention relates to a video based computer interface in which a user's hand gestures and hand motions are used to control virtual objects, to select various commands, and to draw three dimensional curves and surfaces in a virtual computer environment.

2. Description of the Related Art

Various types of computer control and interface devices exist for inputting commands to a computer. Such devices may for example take the form of a computer mouse, joystick or trackball, wherein a user manipulates the interface device to perform a particular operation such as to select a specific entry from a menu of options, perform a "click"or "point" function, etc. A significant problem associated with such interface devices is that a surface area is needed for placement of the device and, in the case of a mouse, to accommodate device movement and manipulation. In addition, such interface devices are generally connected by a cable to a computer CPU with the cable typically draped across the user's desk, causing obstruction of the user's work area. Moreover, because interface device manipulation for performing operations is not consistent with common communication movements, such as the use of a pointing finger hand gesture to select a menu entry, as opposed to maneuvering a mouse until the cursor rests on the desired menu entry, a user must become comfortable and familiar with the operation of the particular interface device before proficiency in use may be attained.

The drawbacks of traditional two-dimensional input devices are particularly exacerbated in computer-based three dimensional object manipulation applications. In such applications, a virtual three dimensional environment is typically displayed to the user with one or more displayed virtual objects positioned within the virtual environment. The user may delete, move and otherwise change the objects in the virtual environment or create new objects. Other functions may be performed in the virtual environment such, for example as, drawing curves. Traditional input devices are extremely difficult to use in such a virtual environment because traditional devices control only two degrees of freedom, and thus a combination of several input devices or a sequence of operations is required to control three or more degrees of freedom as is necessary in three dimensional applications. Such a combination control scheme is cumbersome, unintuitive and requires significant training on the user's part.

It would thus be desirable to provide a computer interface that enables common and intuitive hand gestures and hand motions to be used for interacting with a three dimensional virtual environment. It would further be desirable to provide a system and method for creating, manipulating, changing, and deleting virtual objects in the virtual environment using hand gestures. It would also be desirable to provide a system and method for drawing free-form shapes in the virtual environment using hand gestures.

SUMMARY OF THE INVENTION

The present invention provides a system and method for manipulating virtual objects in a virtual environment, for drawing curves and ribbons in the virtual environment, and for selecting and executing commands for creating, deleting, moving, changing, and resizing virtual objects in the virtual environment using intuitive hand gestures and motions. The system includes a control unit for controlling operation of the system, a display for displaying a virtual environment to a user, and a video gesture recognition (hereinafter "VGR") subsystem for identifying and interpreting motions and gestures of a user's hand made by the user within an identification zone monitored by the VGR subsystem.

The inventive system operates in one of several different selectable modes of operation. The user may select a particular mode for the system by presenting an activation gesture to the VGR subsystem to cause the control unit to display a main menu with several menu commands corresponding to different system modes. The user may then present a selection gesture to identify a particular desired command from the main menu and then repeat the activation gesture to cause the control unit to execute the selected command. The modes of operation include a gripper mode, a drawing mode, an object mode, a view mode, and a clear mode.

In the gripper mode, when the user presents a gripping hand gesture to the VGR subsystem, the control unit generates a pair of gripping elements in the virtual environment corresponding to two gripping fingers of the user's hand. The user may then use the gripping elements to grasp, manipulate, and release a virtual object within the virtual environment.

In the drawing mode, the user selects a curve or ribbon drawing command from a drawing sub-menu. The user then presents the selection gesture to the VGR subsystem and subsequently draws a free-form curve or ribbon in the virtual environment by moving his hand while maintaining the selection gesture.

In the object mode, the user may use the selection and activation gestures to select and execute commands from an object submenu to create a new virtual object, to delete an existing virtual object, to change a virtual object's characteristics, and to resize a virtual object.

In the view mode, the user may dynamically manipulate the orientation and position of a view through which the virtual environment is displayed on the display by presenting the gripping gesture to the VGR subsystem and moving the hand and the gripping fingers within the identification zone.

When the user selects the clear mode, the control system eliminates all virtual objects, curves and/or ribbons from the virtual environment and resets the orientation and position of the virtual environment view to its original setting.

The user may terminate each of the above-described modes and cause the control system to re-display the main menu by presenting the activation gesture to the VGR subsystem. Thus, the system of the present invention enables the user to manipulate virtual objects, to draw free-form curves and ribbons and to invoke various command sets and commands in the virtual environment by presenting particular predefined hand gestures and/or hand movements to the VGR subsystem.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures.

DETAILED DESCRIPTION OF THE PRESENTLY PREFERRED EMBODIMENT

Figure 1:
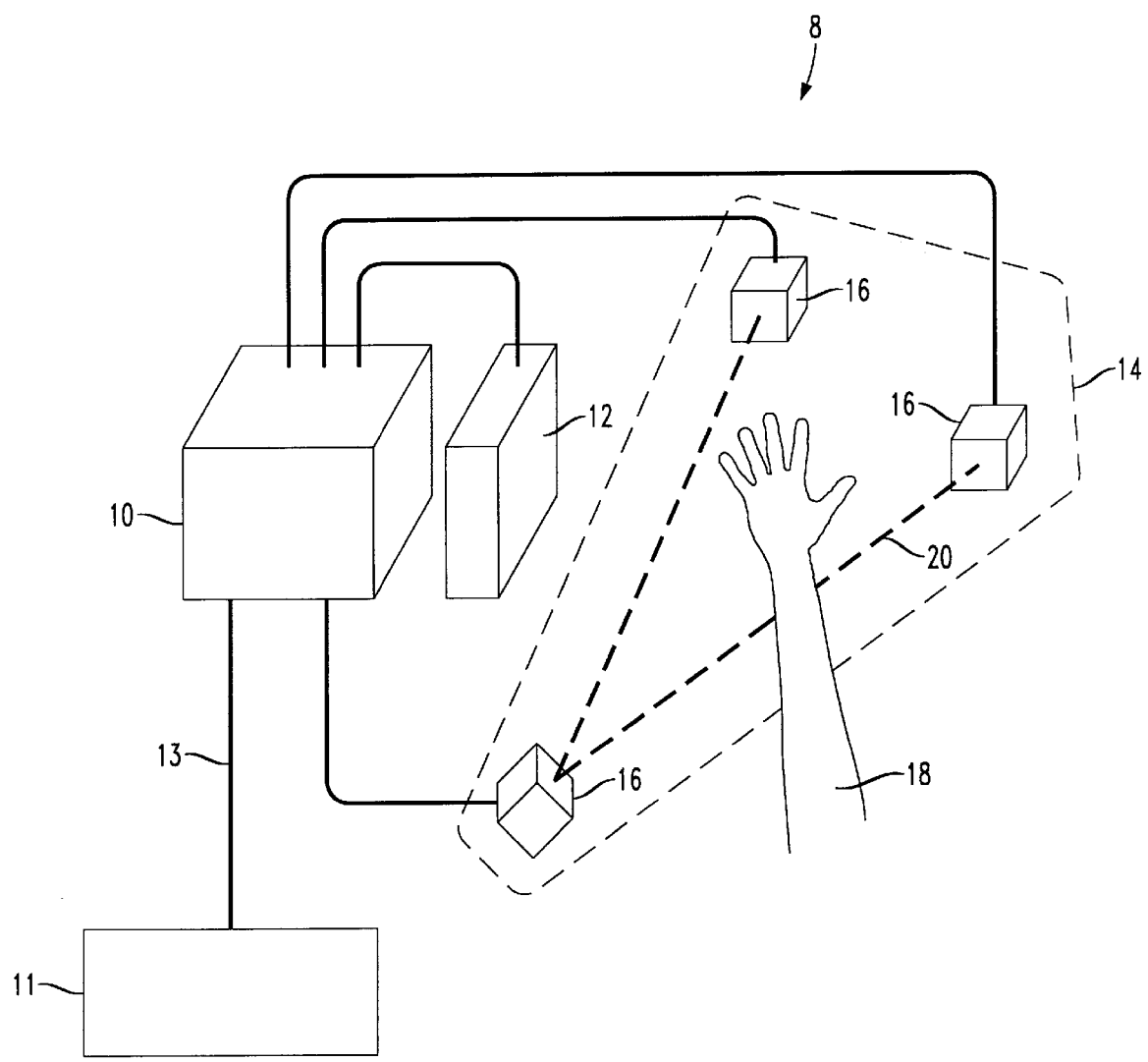
FIG. 1 is a schematic block diagram of a computer system having a gesture based computer interface wherein hand gestures and hand motions are used to control virtual objects and to draw three dimensional curves and surfaces in a virtual computer environment displayed to a user by the computer system in accordance with the present invention.

Referring now to the drawings, and initially to FIG. 1 thereof, a gesture-based three dimensional interface system 8 is there shown. The system 8 is formed of or includes a control system 10, such as a personal computer or a workstation, for controlling the system's operation, a display unit 12, such as a display monitor, for displaying a virtual three dimensional environment to a user, and a video gesture recognition (hereinafter "VGR") subsystem 14 for monitoring a predefined identification zone 20, for identifying hand gestures and movements made by a user's hand 18 within the identification zone 20 and for converting the hand gestures and hand movements to digital signals that are interpreted by the control unit 10 as various commands. The VGR subsystem 14 preferably comprises at least two video cameras or similar image acquisition devices 16 oriented to monitor the identification zone 20. Preferably, the identification zone 20 is defined in an area proximate to the user and the display unit 12 so that the user may comfortably observe the display unit 12 while making desired hand gestures and movements within the zone 20. The display unit 12 need not, however, be located proximate the user and such proximity is not a requirement of the present invention.

Video gesture recognition systems are well known in the art, and thus need not be described in detail herein other than with reference to various functions thereof. In accordance with preferred forms of the invention, the VGR subsystem 14 is capable of recognizing a predetermined number of various hand gestures and is capable of tracking movement of the user's hand 18 and individual fingers thereof with at least six degrees of freedom. It should be noted that while several exemplary hand gestures are described below with reference to FIGS. 3–5, other hand gestures may be added and/or substituted as a matter of design choice without departing from the spirit of the invention.

Figure 2:
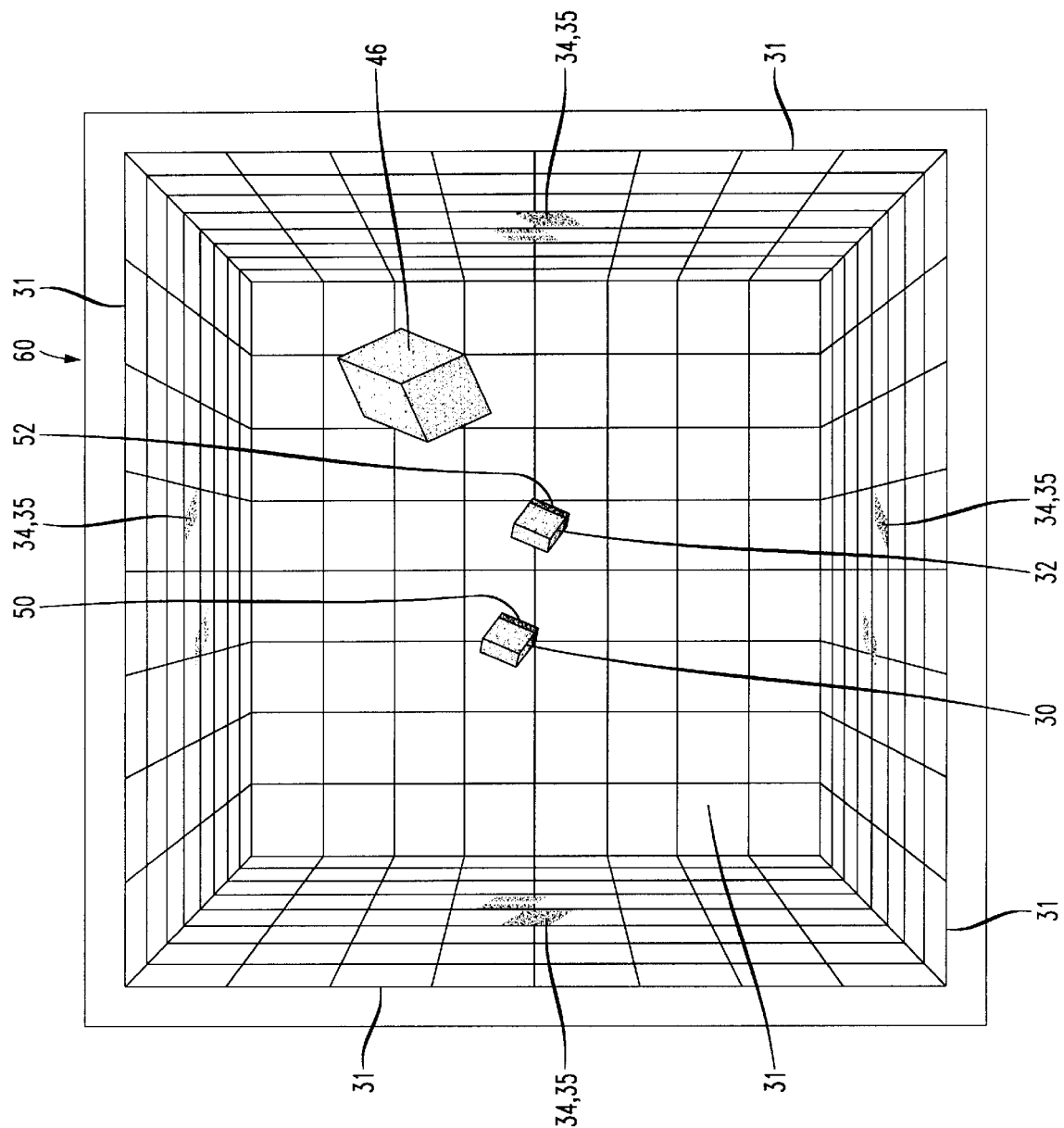
FIG. 2 is a diagram of the virtual environment and gripping elements in the virtual environment displayed on a display of the computer system of FIG. 1 in accordance with the present invention.
Figure 3:
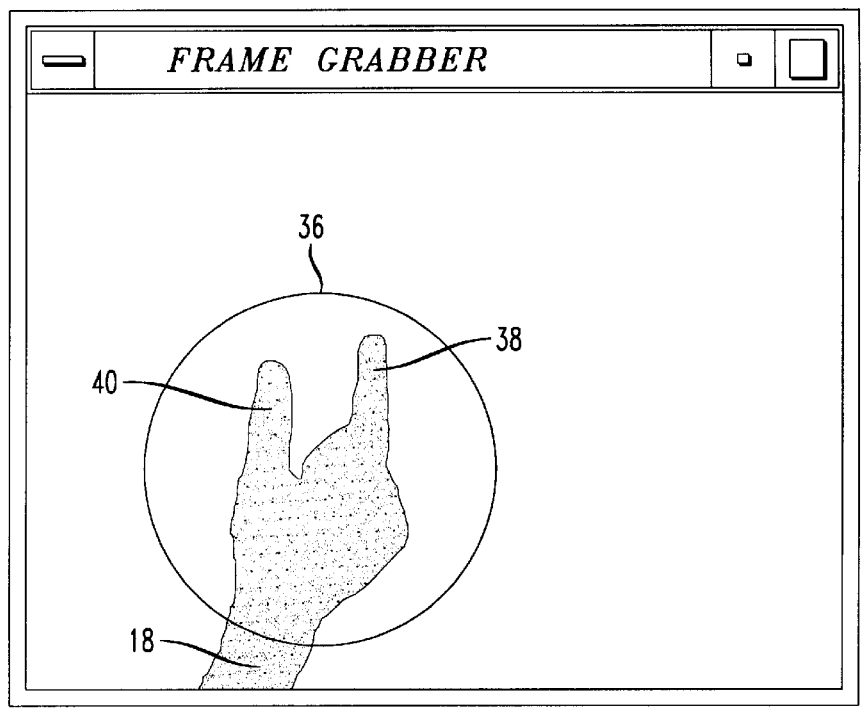
FIG. 3 is a representation of an exemplary gesture of the user's hand used to control the gripping elements of FIG. 2 in accordance with the present invention.

Referring to FIG. 2, when the system 8 is initialized a virtual three dimensional environment 60, defined by several boundary planes 31, is displayed to the user on the display unit 12 from a predefined view with predefined orientation and position (i.e. vantage point) characteristics. When the user presents to the VGR subsystem 14 a grasping gesture with two fingers of the hand 18 that are held opposed to one another within the identification zone 20, the control system 10 generates a first gripping element 30 and a second gripping element 32 in the virtual environment 60, each of the two gripping elements 30 and 32 corresponding to one of the opposed fingers. An exemplary grasping gesture 36 is shown in FIG. 3, where the first opposing finger, corresponding to the first gripping element 30, is an index finger 38 and the second opposing finger, corresponding to the second gripping element 32, is a thumb 40. The first gripping element 30 includes a tip 50, while the second gripping element 32 includes a tip 52 substantially opposing the tip 50. Preferably tips 50 and 52 correspond to the tips of index finger 38 and thumb 40, respectively. The tips 50 and 52 represent portions of the respective gripper elements 30 and 32 that interact with virtual objects in the virtual environment 60 in a similar manner to the way in which tips of the user's gripping fingers interact with real world objects. Optionally, the control system 10 generates gripper shadows 34 and 35 on the boundary planes 31, corresponding to the gripper elements 30 and 32, respectively. The gripper shadows 34 and 35 improve the user's depth perception with respect to the virtual environment 60 and assist the user in determining the position of the grippers 30 and 32 within the virtual environment 60.

As the user's hand 18 and fingers 38 and 40 move within the identification zone 20, the VGR subsystem 14 continuously tracks and identifies relative positions and orientations of the user's fingers, such as the index finger 38 and the thumb 40, as well as the position of the hand 18 with respect to coordinates of the virtual environment 60. The VGR subsystem 14 then generates and transmits, to the control system 12, signals representative of the orientations and positions of the user's hand and fingers within the identification zone 20. In response to these signals the control system 10 proportionally changes the position and orientation of the gripping elements 30 and 32 within the virtual environment 60. Thus, for example, if the user moves the fingers 38 and 40 apart, the control system 10 causes the gripping elements 30 and 32 to move apart. Similarly, if the user moves the hand 18 downward, the control system 10 causes the gripping elements 30 and 32 to both move downward.

In order to grasp a virtual object 46 in the virtual environment 60, the user moves the hand 18 while maintaining the gripping gesture 36 until the gripping elements 30 and 32 are aligned with the virtual object 46, and then moves the fingers 38 and 40 toward one another until the tips 50 and 52 of the respective gripping elements 30 and 32 intersect with the object 46. Thus, the user may grasp the virtual object 46 by making an intuitive and natural grasping gesture. Optionally, when the object 46 is grasped, the control system 10 changes the color of the object 46 to a different color, such for example to a red color, to indicate to the user that the object 46 has been successfully grasped. After the object 46 has been grasped, the user may freely move, rotate and otherwise manipulate the object 46 in the virtual environment 40 by moving the hand 18 and repositioning the fingers 38 and 40 while maintaining the grasping gesture. The user may also release the grasped object 46 by moving the fingers 38 and 40 apart from one another until the tips 50 and 52 of the respective gripping elements 30 and 32 no longer intersect with the object 46. If the color of object 46 was changed when the object was grasped, the control system 10 changes the color of the object 46 back to its original color when the object is released, thus indicating to the user that the object 46 has been successfully released. In this manner, the object 46 may be readily grasped, manipulated and then released by the user using only intuitive gestures and movement of the user's hand 18.

Figure 4:
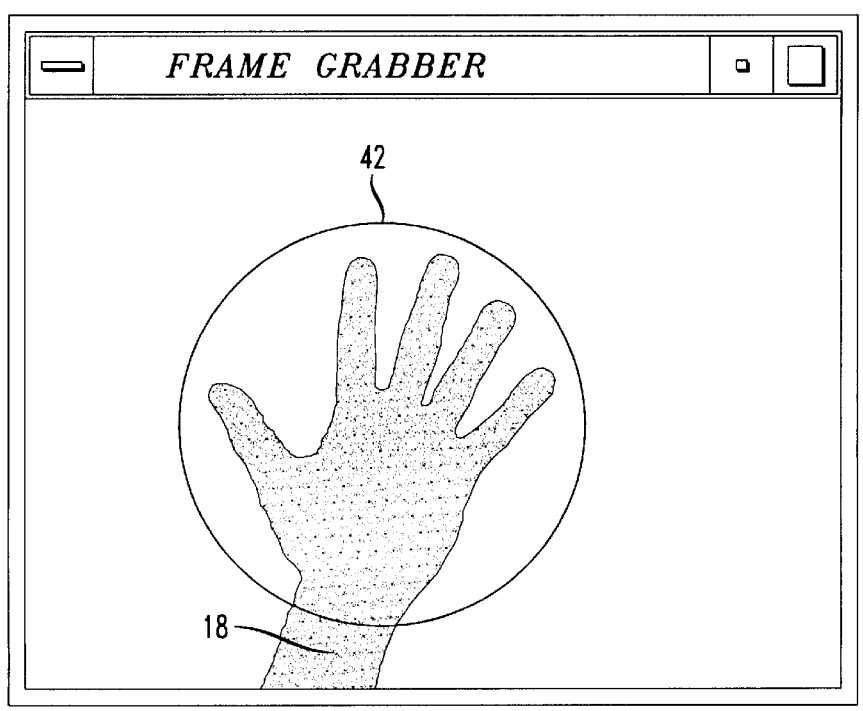
FIGS. 4–5 are representations of exemplary gestures of a user's hand used to interact with the computer system of FIG. 1 in accordance with the present invention.
Figure 6:
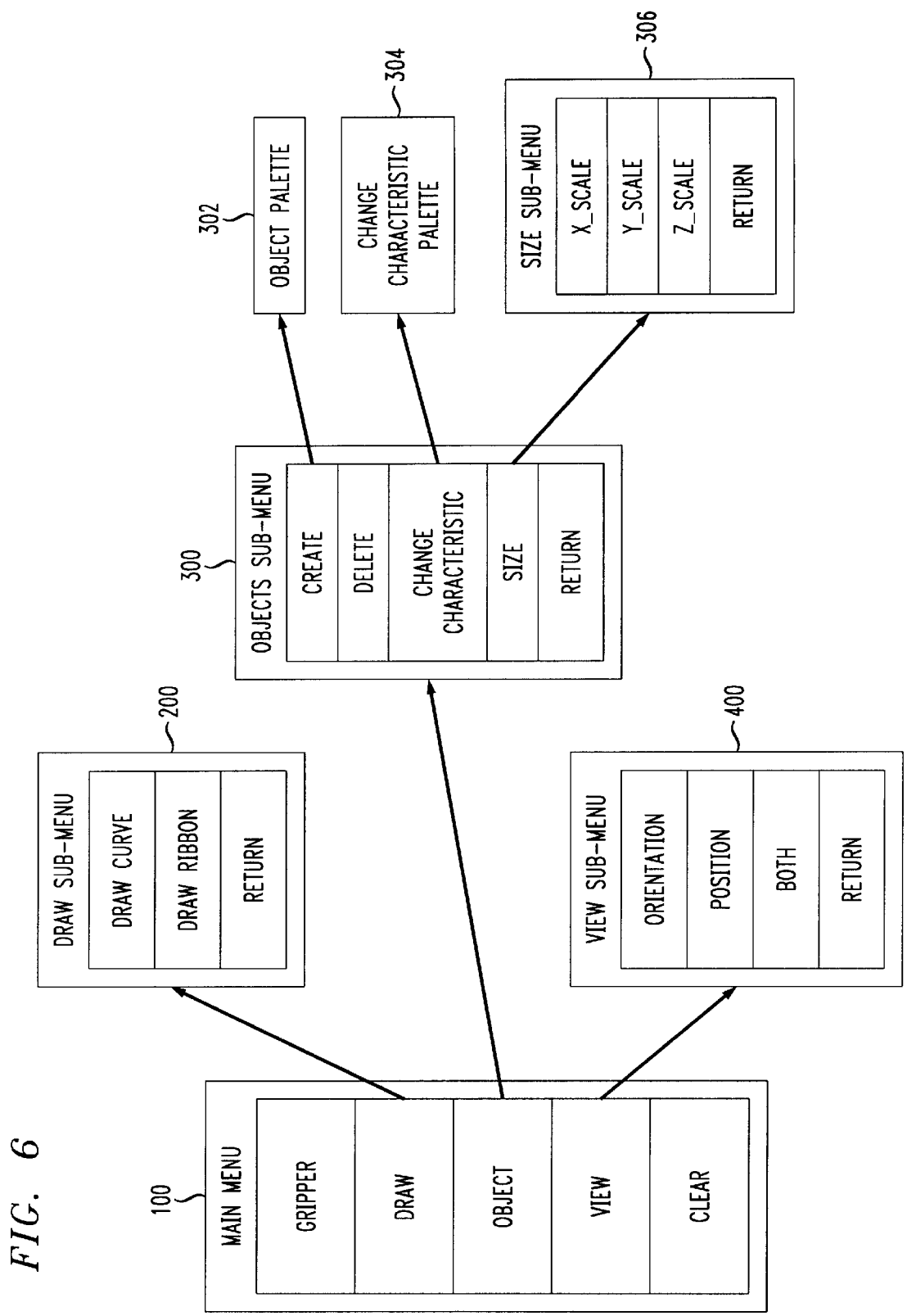
FIG. 6 is a diagram of exemplary menus and sub-menus of the gesture based computer interface of the system of FIG. 1.

The initial configuration of the system 8 in which the gripping elements 30 and 32 are displayed and may be used to grasp, manipulate and release virtual objects is called a GRIPPER mode. The system 8 preferably operates in several other modes that may be invoked by the user when the user presets a predetermined activation hand gesture to the VGR subsystem 14 within the identification zone 20. An exemplary activation gesture 42, in which the hand 18 is open and the fingers are in a reaching position, is shown in FIG. 4. When the activation gesture 42 is presented, the control unit 10 terminates the display of gripping elements 30 and 32, and displays a main control menu on the display unit 12 in the virtual environment 60. An exemplary main control menu 100 and a variety of exemplary sub-menus 200 to 400 for invoking different modes of operation of the system 8 are shown in FIG. 6. It should be understood that the various menus and menu commands shown in FIG. 6 are by way of illustrative example. Other appropriate menus and menu commands may be freely added to and/or substituted for the exemplary menus and menu commands without departing from the spirit of the invention.

Figure 5:
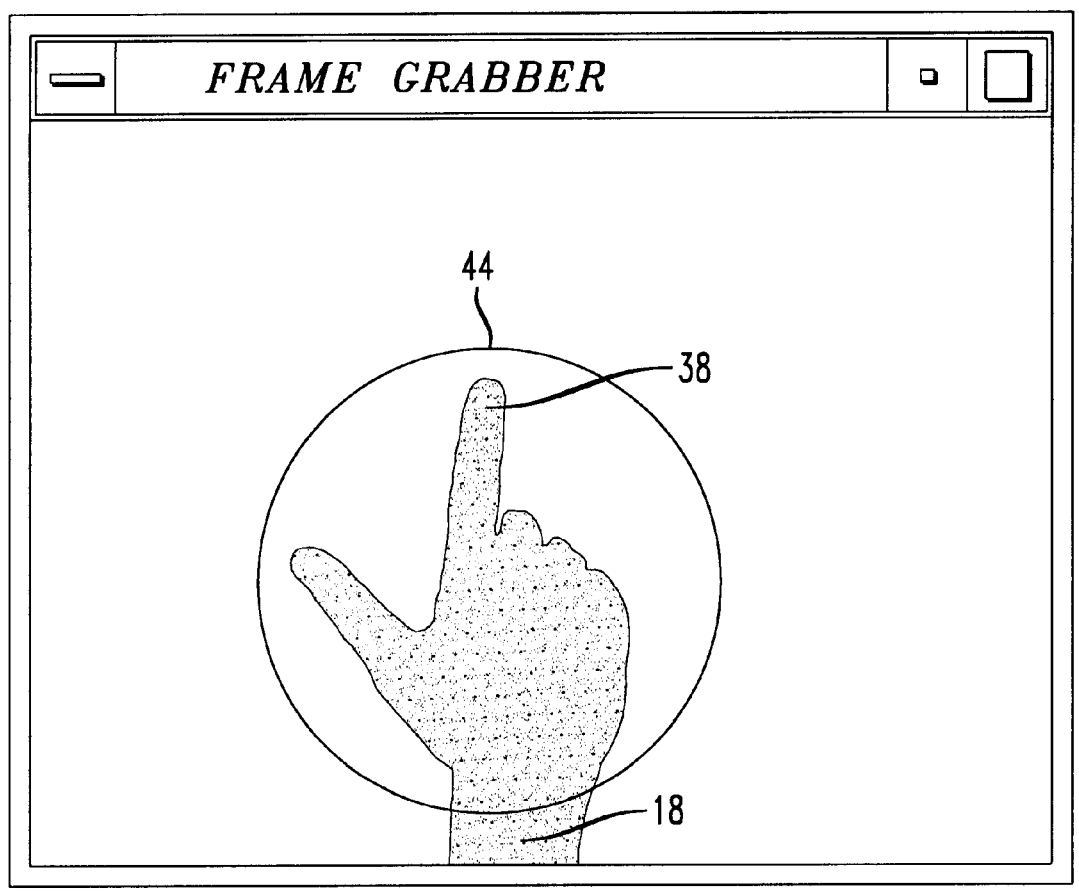
Figure 7:
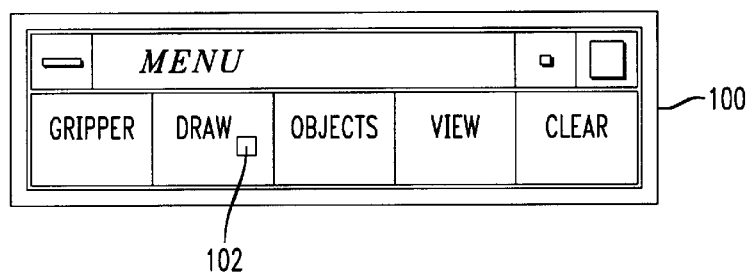
FIG. 7 is a diagram of an exemplary menu of FIG. 4 showing a menu command selected with a visual selection identifier of the gesture based computer interface of the system of FIG. 1.

The main menu 100 includes five menu commands: GRIPPER, DRAW, OBJECTS, VIEW, and CLEAR; each of the menu commands corresponds to a particular mode of the system 8. To select a particular menu command from the menu 100 or from any sub-menu 200–400, the user presents a predefined selection hand gesture to the VGR subsystem 14 within the identification zone 20. An exemplary selection gesture 44, in which the hand 18 is closed and the index finger 38 is in a pointing position, is shown in FIG. 5. When the selection gesture 44 is presented, the control unit 10 generates a visual selection indicator, such as the exemplary visual selection indicator 102 shown in FIG. 7, that corresponds to the direction in which the index finger 38 is pointed and that moves in response to movement of the user's index finger 38.

The user may move the index finger 38 while maintaining the selection gesture 44 to position the visual selection indicator 102 over a desired menu command on a displayed menu in order to select the desired menu command for execution by the control system 10. For example, in FIG. 7 the user has positioned the visual selection indicator 102 over the DRAW command. To cause the control system 10 to execute the selected command, the user presents the activation gesture 42. Thus in order to cause the system 8 to enter the DRAW mode when the main menu 100 is displayed, the user must first present the selection gesture 44, then move the index finger 38 until the visual indicator 102 is positioned over the DRAW command, and then present the activation gesture 42.

When the user activates the GRIPPER mode by selecting and executing the GRIPPER command from the main menu 100, the control system 10 enters the GRIPPER mode as described above in connection with FIGS. 2 and 3. To terminate the GRIPPER mode and re-display the main menu 100, the user presents the activation gesture 42.

When the user activates the DRAW mode by selecting and executing the DRAW command from the main menu 100, the control system 10 replaces the main menu 100 with a draw sub-menu 200 on the display unit 12. The drawing sub-menu 200 may for example include a DRAW CURVE command, a DRAW RIBBON command, and a RETURN command. When the user selects and executes the DRAW CURVE command, the control system 10 terminates display of the draw sub-menu 200 and enables the user to draw a free-form curve (not shown) in the virtual environment 60. The user begins drawing the curve by presenting the selection gesture 44. The curve originates from an initial position of the index finger 38 and is generated by the control system 10 as the user moves the finger 38. Thus, the user may draw a free-form curve in the virtual environment 60 by moving the index finger 38 in a natural and intuitive manner.

Similarly, when the user selects and executes the DRAW RIBBON command, the control system 10 terminates display of the draw sub-menu 200 and enables the user to draw a free-form ribbon of a predetermined width (not shown) in the virtual environment 60. The user begins drawing the ribbon by presenting the selection gesture 44. The ribbon originates from an initial position of the index finger 38 and is generated by the control system 10 as the user moves the finger 38. Preferably, the ribbon consists of a number of connected contiguous planar surfaces, each surface being generated by the control system 10 in response to incremental movement of the index finger 38, where the orientation of each individual surface corresponds to orientation of the index finger 38 during the incremental movement. Thus, the user may draw a free-form ribbon in the virtual environment 60 by moving the index finger 38 in a natural and intuitive manner. To terminate the DRAW mode, the user presents the activation gesture 42. The control system 10 terminates the draw mode and re-displays the main menu 100. If the user entered the DRAW mode in error, then the user may cause the control system 10 to terminate display of the drawing sub-menu 200 and to re-display the main menu 100 by selecting and executing the RETURN command from the drawing sub-menu 200. The RETURN command appearing in other sub-menus 300–306 may be invoked in a similar manner for the purpose of terminating a particular mode of operation and returning to the main menu 100.

When the user activates the OBJECT mode by selecting and executing the OBJECT command from the main menu 100, the control system 10 replaces the main menu 100 with an object sub-menu 300 on the display unit 12. The object sub-menu 300 may for example include a CREATE OBJECT command, a DELETE OBJECT command, a CHANGE CHARACTERISTIC command, a SIZE command, and the RETURN command. When the user selects and executes the CREATE OBJECT command, the control system 10 displays an OBJECT PALETTE 302 containing a set of displayed object types (not shown) for selection by the user. The object types in the OBJECT PALETTE 302 may include, but are not limited to, geometric shapes and objects such as rectangles, cubes, spheres, toroids and alphanumeric characters such as letters and/or numbers. Other displayable object types may be included in the OBJECT PALETTE 302 as a matter of design choice. To select a particular object type for creation, the user presents a selection gesture 44, positions the visual selection indicator 102 over the particular desired object type, and then presents the activation gesture 42. The control system 10 then terminates the display of the object sub-menu 300 and the OBJECT PALETTE 302 and generates a new virtual object (not shown) corresponding to the selected particular object type in the virtual environment 60. The control system 10 then automatically enters the GRIPPER mode so that the newly created object may be manipulated.

Figure 8:
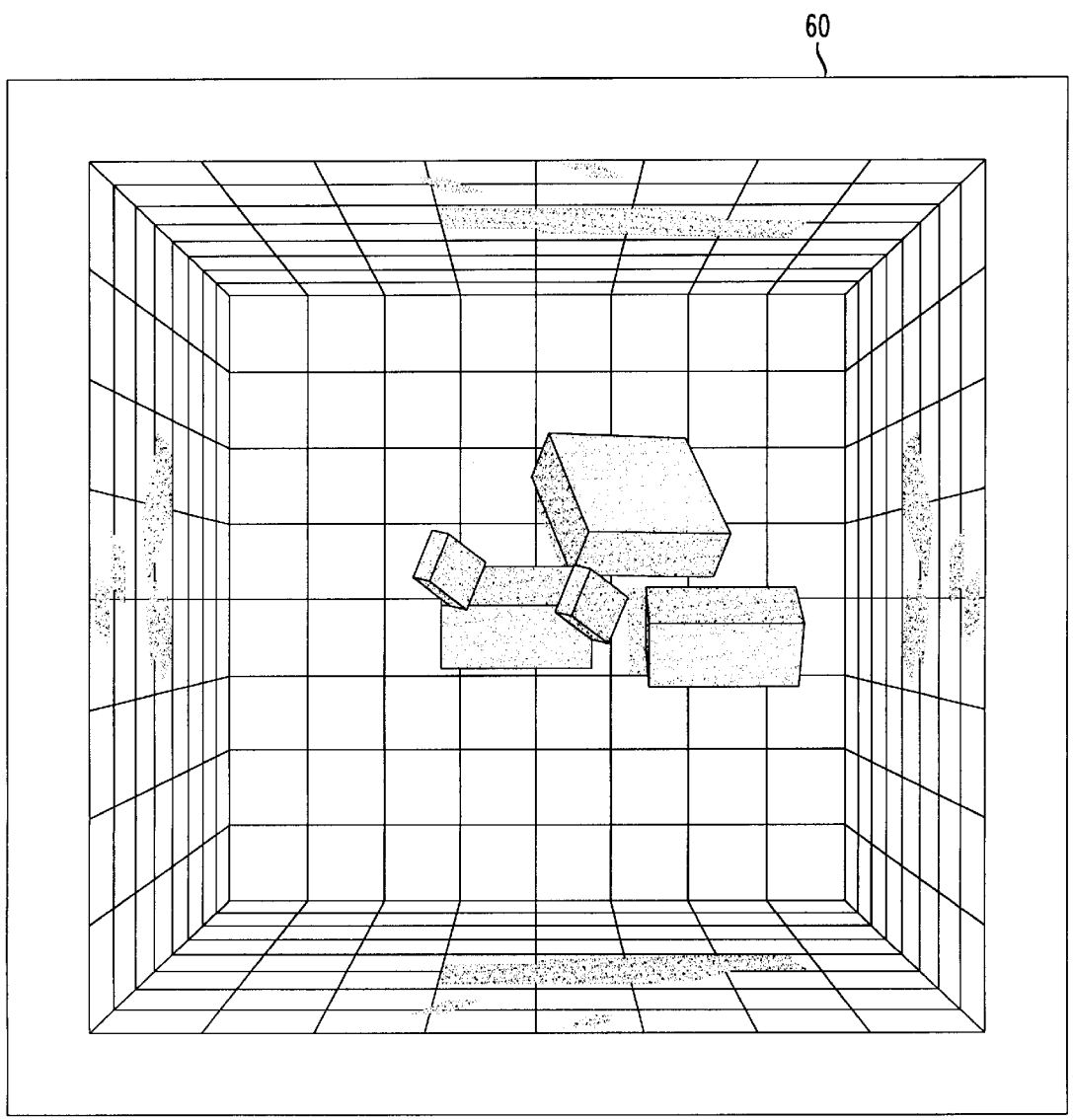
FIG. 8 is a diagram of the virtual environment of FIG. 6 with exemplary objects created and positioned in the virtual environment using the gesture based computer interface of the system of FIG. 1.

Preferably, the newly created virtual object is positioned proximal the tips 50 and 52 of the respective gripper elements 30 and 32. An exemplary virtual environment 60 with several created virtual objects is shown in FIG. 8. Thus, the user may easily and intuitively create new virtual objects in the virtual environment 60.

When the user selects and executes the DELETE OBJECT command, the control system 10 terminates display of the object sub-menu 300 and enters the GRIPPER mode. The control system 10 then eliminates from the virtual environment 60 the first virtual object grasped by the user using the gripper elements 30 and 32. Thus, the user may easily and intuitively delete virtual objects in the virtual environment 60.

When the user selects and executes the CHANGE CHARACTERISTIC command, the control system 10 displays a CHANGE CHARACTERISTIC PALETTE 304 containing a set of different object characteristics (not shown) for selection by the user. The CHANGE CHARACTERISTIC PALETTE 304 may include, but is not limited to, a variety of selectable object characteristics such as colors, shininess types, and textures. Alternately, the object sub-menu 300 may include several CHANGE CHARACTERISTIC palettes, with each palette containing a particular object characteristic type for selection by the user. Thus, for example, the object sub-menu 300 may include a change color palette, a change shininess palette, and/or a change texture palette (not shown). When the user selects a particular new characteristic from the CHANGE CHARACTERISTIC PALETTE 304, the control system 10 terminates display of the object sub-menu 300 and the CHANGE CHARACTERISTIC PALETTE 304, and enters the GRIPPER mode. The control system 10 then changes an appropriate characteristic of the first virtual object grasped by the user using the gripper elements 30 and 32 to the new characteristic selected from the CHANGE CHARACTERISTIC PALETTE 304. Thus, if the user selected a blue color from the CHANGE CHARACTERISTIC PALETTE 304, the control system will change the color of the first virtual object grasped by the user using the gripper elements 30 and 32 to blue.

When the user selects and executes the SIZE command, the control system 10 displays a size sub-menu 306. The size sub-menu 306 includes a X_SCALE command, a Y_SCALE command, a Z_SCALE command and the RETURN command. The various commands of the size sub-menu 306 enable the user to scale a particular virtual object in one or more axial directions. To resize the particular virtual object along an x-axis predefined in the virtual environment 60, the user selects and executes the X_SCALE command. The control system 10 first displays the gripper elements 30 and 32, so that when the user grasps the particular virtual object, the user may move the gripping elements 30 and 32 in a positive direction of the x-axis to cause the control system 10 to proportionally increase the size of the particular virtual object along the x-axis, or in a negative direction of the x-axis to cause the control system 10 to proportionally decrease the size of the particular virtual object along the x-axis. When the user releases the particular virtual object, the control system 10 returns to the size sub-menu 306. In a similar manner, the user may scale the particular virtual object along a y-axis and a z-axis defined in the virtual environment 60 by selecting and executing the respective Y_SCALE and Z_SCALE commands and then moving the gripping elements 30 and 32 in appropriate positive or negative directions along the respective axis.

When the user activates the VIEW mode by selecting and executing the VIEW command from the main menu 100, the control system 10 replaces the main menu 100 with a view sub-menu 400 on the display unit 12. The view sub-menu 400 may for example include an ORIENTATION command, a POSITION command, a BOTH command, and the RETURN command. When the user selects and executes the ORIENTATION command, the control system 10 terminates display of the view sub-menu 400 and enables the user to change the predefined orientation of the view from which the virtual environment 60 is displayed to the user on the display unit 12 by presenting a gripping gesture 36 and rotating the fingers 38 and 40. The control system 10 changes the orientation of the view in accordance with an angle of rotation of the fingers 38 and 40. For example, when the user rotates the fingers 38 and 40 by 90 degrees, the control system 10 changes the orientation of the user's view into the virtual environment 60 by 90 degrees.

When the user selects and executes the POSITION command, the control system 10 terminates display of the view sub-menu 400 and enables the user to change the predefined position (i.e. vantage point) of the view from which the virtual environment 60 is displayed to the user on the display unit 12, by presenting a gripping gesture 36 and moving the hand 18 within the identification zone 20. The control system 10 changes the position of the view in accordance with movement of the hand 18. For example, when the user moves the hand 18 downward, the control system 10 changes the position of the user's view into the virtual environment 60 accordingly.

When the user selects and executes the BOTH command, the control system 10 terminates display of the view sub-menu 400 and enables the user to simultaneously change the predefined orientation and position of the view from which the virtual environment 60 is displayed to the user on the display unit 12 by presenting a gripping gesture 36 and rotating the fingers 38 and 40 while moving the hand 18 within the identification zone 20. The control system 10 changes the orientation of the view in accordance with the angle of rotation of the fingers 38 and 40, and changes the position of the view in accordance with movement of the hand 18. To terminate manipulation of the position and/or orientation of the user's view into the virtual environment 60, the user presents the activation gesture 42 causing the computer system 10 to re-display the main menu 100.

When the user activates the CLEAR mode by selecting and executing the CLEAR command from the main menu 100, the control system eliminates all virtual objects, curves and ribbons in the virtual environment 60 and restores the predefined virtual environment 60 view with predefined orientation and position characteristics.

Thus, the present invention provides a system and method for manipulating virtual objects in a virtual environment, for drawing curves and ribbons in the virtual environment, and for selecting and executing commands for creating, deleting, moving, changing, and resizing virtual objects in the virtual environment using intuitive hand gestures and motions.

Various modifications to the inventive methods and systems are contemplated and will be apparent to those skilled in the art. For example, the disclosure and depiction (see FIG. 2) of the first and second gripping elements 30, 32 as simple, generally-rectangular blocks is presented by way of example only. Indeed, in a currently most preferred form of the invention the gripping elements 30, 32 may be depicted on the display unit 12 as parts or elements of a virtual (i.e. computer-generated) robotic arm or manipulator assembly.

As should be apparent, the particular form in which the gripping elements are shown or displayed is primarily a matter design choice.

Those skilled in the art will likewise appreciate that the inventive system 8 may further include, or be connected to a control interface for, a physical assembly such as a robotic arm or manipulator, so that the user-effected manipulation of virtual objects seen on the display unit 12 is utilized to directly effect and control the corresponding movement of the physical robotic arm or manipulator and the manipulation thereby of actual objects in a real-world space or environment. This is shown by way of example in FIG. 1, wherein a physical robotic manipulator 11 is shown attached to the control unit 10 by an interface or connection 13 which may comprise a wired or a wireless connection to control unit 10. In this manner a user situated in or proximate the identification zone can precisely effect the controlled manipulation of optionally physically-remote, real-world objects using intuitive hand gestures and motions. The invention thereby enables ready manipulation of real-world objects that are disposed, inter alia, in inaccessibly remote or hazardous locations or environments—such for example in a radioactive chamber, or in space—from a workstation console provided at a safe and convenient location. Moreover, in some applications it may be appropriate or desirable to manipulate a real-world object while directly observing the object—i.e. without having, or ignoring, a display unit that concurrently depicts the ongoing manipulation in a virtual environment. Thus, in handling and manipulating dangerous chemicals or substances in a laboratory, a user situated in or proximate the identification zone 20 can use intuitive hand gestures and motions to effect the desired manipulative operations while directly observing a robotic arm or manipulator that is carrying out those operations proximate the zone 20, as for example in a closed or shielded space defined within the laboratory and having a transparent wall or window through which the user can dynamically observe the user-controlled manipulation. In such situations the presence or inclusion of a display unit 12 displaying the manipulation in a virtual environment is not a requirement of the present invention. In any event, the interface or connections required to deliver the appropriate control signals to the real-world robotic arm or manipulator in accordance with the user-effected hand gestures and motions that are identified using the methods and apparatus of the present invention are well within the abilities of the person of ordinary skill in the art.

Thus, while there have been shown and described and pointed out fundamental novel features of the present invention as applied to preferred embodiments thereof, it will be understood that various omissions and substitutions and changes in the methods described and in the form and details of the devices illustrated, and in their operation, may be made by those skilled in the art without departing from the spirit of the present invention. For example, it is expressly intended that all combinations of those elements and/or method steps which perform substantially the same finction in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method of manipulating a virtual object in a three dimensional virtual environment implemented in a computer system having a display unit for displaying the virtual environment and a video gesture recognition subsystem that monitors a predefined identification zone, said method manipulating the virtual object in response to predetermined hand gestures and movements made by a user's hand within the identification zone and identified by the video gesture recognition subsystem, comprising the steps of:

(a) generating, by the computer system, a first gripper element having a first end portion and a second gripper element having a second end portion for display on the display unit in the virtual environment, wherein said first and second gripper elements are positioned in substantially parallel relation to align said first and said second end portions with one another, wherein said first gripper element corresponds to and is operatively moved and oriented in accordance with a first finger of the user's hand, wherein said second gripper element corresponds to and is operatively moved and oriented in accordance with a second finger of the user's hand, wherein said first and second grippers are moved in accordance with movement of the user's hand within the identification zone, and wherein said first gripper element is moved with respect to said second gripper element corresponding to movement of the user's first finger with respect to the user's second finger;

(b) grasping, by user movement of the user's first and second fingers, the virtual object by aligning said first and second gripper elements with the virtual object and moving said first and said second gripper elements into proximity with one another until said first and said second end portions intersect with the virtual object; and (c) manipulating, by user movement of the user's hand and the user's first and second fingers, the grasped virtual object.

2. The method of claim 1, wherein said step (c) comprises the step of moving by the user, the grasped virtual object within the virtual environment by moving said first and said second gripper elements while maintaining the intersection of said first and said second end portions with the virtual object.

3. The method of claim 1, further comprising the step of:

(d) releasing, by user movement of the user's first and second fingers, the grasped virtual object by moving said first and said second gripper elements apart from one another until said first and said second end portions no longer intersect the virtual object.

4. The method of claim 1, wherein said virtual object is of a predetermined first color, further comprising the steps of, (e) after said step (b), changing, by the computer system, the color of the grasped virtual object to a predetermined second color to indicate to the user that the virtual object has been successfully grasped; and (f) after said step (d), changing, by the computer system, the color of the grasped virtual object back to said first color to indicate to the user that the virtual object has been successfully released.

5. The method of claim 1, further comprising the steps of:

(g) displaying, by the computer system on the display unit when the video gesture recognition subsystem identifies a predetermined first hand gesture made by the user, a first menu having a first plurality of menu commands, each of said first plural menu commands defining a unique visual command area;

(h) selecting, by the user, a particular menu command of said displayed first plural menu commands by generating, by the computer system for display on the display unit in the virtual environment when the video gesture recognition subsystem identifies a second hand gesture made by the user, a visual selection identifier responsive to movement of a predefined finger of the user's hand so that when the user points to said particular menu command of said first plurality of menu commands, said visual selection identifier is positioned within said visual command area of said particular menu command to thereby select said particular menu command; and (h) determining, by the control system, the filter matrix for adjusting the frequency of the filter with respect to the input signal;

(i) executing by the computer system, when the video gesture recognition subsystem identifies said first hand gesture made by the user, said particular selected menu command.

6. The method of claim 5, further comprising the step of:

(j) generating, by the control system under direction of the user, one of a curve and a ribbon in the virtual environment.

7. The method of claim 6, wherein said particular menu command executed at said step (i) comprises a drawing command, and wherein said step (j) further comprises the step of:

(k) replacing, by the computer system, said first menu displayed on the display unit in the virtual environment with a drawing menu having a plurality of drawing menu commands.

8. The method of step 7, wherein said plurality of drawing commands comprises a curve draw command, and wherein said step (j) further comprises the steps of:

(l) selecting, by the user, the curve draw command from said drawing menu by moving said visual selection indicator to an area of the drawing menu corresponding to the curve draw command;

(m) executing, by the computer system when the video gesture recognition subsystem identifies said first hand gesture made by the user, the curve draw command;

(n) terminating, by the computer system, display of said drawing menu;

(o) generating, by the computer system when the video gesture recognition subsystem identifies said second hand gesture made by the user, a curve in the virtual environment, wherein appearance and position of said curve are responsive to movement of said predefined finger of the user's hand; and (p) terminating generation of said curve and re-displaying said first menu on the display unit, by the computer system, when the video gesture recognition subsystem identifies said first hand gesture made by the user.

9. The method of step 7, wherein said plurality of drawing commands comprises a ribbon draw command, and wherein said step (j) further comprises the steps of:

(q) selecting, by the user, the ribbon draw command from said drawing menu by moving said visual selection indicator to an area of the drawing menu corresponding to the ribbon draw command;

(r) executing, by the computer system when the video gesture recognition subsystem identifies said first hand gesture made by the user, the ribbon draw command;

(s) terminating, by the computer system, display of said drawing menu;

(t) generating, by the computer system when the video gesture recognition subsystem identifies said second hand gesture made by the user, a planar ribbon of a predetermined width in the virtual environment, wherein orientation, appearance and position of said ribbon are responsive to movement and orientation of said predefined finger of the user's hand; and (u) terminating generation of said ribbon and redisplaying said first menu on the display unit by the computer system when the video gesture recognition subsystem identifies said first hand gesture made by the user.

10. The method of step 7, wherein said plurality of drawing commands comprises a return command, further comprising the steps of:

(v) selecting, by the user, the return command from said drawing menu by moving said visual selection indicator to an area of the drawing menu corresponding to the return command;

(w) executing by the computer system when the video gesture recognition subsystem identifies said first hand gesture made by the user, the return draw command; and (x) replacing, by the computer system, said drawing menu displayed on the display unit in the virtual environment with said first menu.

11. The method of claim 5, further comprising the step of:

(y) creating by the computer system under direction of the user, a new virtual object for display by the display unit.

12. The method of claim 11, wherein said particular menu command executed at said step (i) comprises an object command, wherein said step (y) further comprises the step of:

(z) replacing, by the computer system, said first menu displayed on the display unit in the virtual environment with an object menu having a plurality of object menu commands.

13. The method of step 11, wherein said plurality of object commands comprises a create object command, and wherein said step (y) further comprises the steps of:

(aa) selecting, by the user, the create object command from said object menu by moving said visual selection indicator to an area of the object menu corresponding to the create object command;

(bb) executing by the computer system when the video gesture recognition subsystem identifies said first hand gesture made by the user, the create object command;

(cc) displaying by the computer system in the virtual environment on the display unit, an object palette menu having a plurality of displayed selectable object types;

(dd) selecting, by the user, a particular object type from said object palette menu;

(ee) terminating, by the computer system, display of said object menu and said object palette menu; and (ff) generating by the computer system for display by the display unit when the video gesture recognition subsystem identifies said first hand gesture made by the user, a new virtual object corresponding to said particular object type and thereafter repeating said step (a).

14. The method of claim 5, further comprising the step of:

(gg) eliminating by the control system under direction of the user, the virtual object from the virtual environment.

15. The method of claim 14, wherein said particular menu command executed at said step (i) comprises an object command, wherein said step (gg) further comprises the step of:

(hh) replacing said first menu displayed on the display unit in the virtual environment with an object menu having a plurality of object menu commands.

16. The method of step 15, wherein said plurality of object commands comprises a delete object command, and wherein said step (gg) further comprises the steps of:
(ii) selecting, by the user, the delete object command from said object menu by moving said visual selection indicator to an area of the object menu corresponding to the delete object command;
(jj) executing by the computer system when the video gesture recognition subsystem identifies said first hand gesture made by the user, the delete object command;
(kk) terminating, by the computer system, display of said object menu and thereafter repeating said step (a); and
(ll) eliminating, by the computer system, the virtual object from the virtual environment when the virtual object is grasped by said first and said second gripper elements.

17. The method of claim 5, wherein said step (c) comprises the step of:
(mm) changing by the control system under direction of the user, a particular predefined characteristic of the virtual object to a particular alternate characteristic.

18. The method of claim 17, wherein said particular menu command executed at said step (i) comprises an object command, wherein said step (mm) further comprises the step of:
(nn) replacing, by the computer system, said first menu displayed on the display unit in the virtual environment with an object menu having a plurality of object menu commands.

19. The method of step 18, wherein said plurality of object commands comprises a change characteristic command, and wherein said step (mm) further comprises the steps of:
(oo) selecting, by the user, the change characteristic command from said object menu by moving said visual selection indicator to an area of the object menu corresponding to the change characteristic command;
(pp) executing by the computer system when the video gesture recognition subsystem identifies said first hand gesture made by the user, the change characteristic command;
(qq) displaying by the computer system in the virtual environment on the display unit, a change characteristic palette menu having a plurality of selectable alternate object characteristics;
(rr) selecting, by the user, said particular alternate characteristic from said change characteristic palette menu for application to the virtual object;
(ss) terminating, by the computer system, display of said object menu and said change characteristic palette menu, and repeating said step (a); and
(tt) changing, by the computer system, said predefined particular characteristic of the virtual object to said selected particular alternate characteristic, when the virtual object is grasped by said first and said second gripper elements.

20. The method of step 19, wherein said predefined particular characteristic is a color of the virtual object and wherein said plurality of alternate object characteristics comprises a plurality of different colors.

21. The method of step 19, wherein said predefined particular characteristic is a shininess of the virtual object and wherein said plurality of alternate object characteristics comprises a plurality of different shininess types.

22. The method of step 19, wherein said predefined particular characteristic is a texture of the virtual object and wherein said plurality of alternate object characteristics comprises a plurality of different texture types.

23. The method of claim 19, wherein said particular characteristic is a size of the virtual object and wherein said plurality of alternate object characteristics comprises a plurality of scaling parameters, each plural scaling parameter corresponding to a different coordinate axis having a positive and a negative direction and being defined in the virtual environment, further comprising the steps of:
(uu) repeating, by the computer system, said step (a) and said step (b) and thereafter moving, by the user, said first and said second gripper elements along one of said coordinate axes to change the size of the grasped virtual object along said one axis, wherein when said first and said second gripper elements are moved in the positive direction of said one axis the computer system increases the size of the virtual object along said one axis, and when said first and said second gripper elements are moved in the negative direction of said one axis the computer system decreases the size of the virtual object along said one axis; and
(vv) replacing by the computer system when said virtual object is released from said first and said second gripping elements, said first and said second gripper elements with said change characteristic palette.

24. The method of claim 5, further comprising the step of:
(ww) changing, by the control system under direction of the user, a view of the virtual environment.

25. The method of claim 24, wherein said particular menu command executed at said step (i) comprises a view command.

26. The method of step 25, wherein said step (ww) further comprises the steps of:
(xx) terminating, by the computer system, display of said first menu;
(yy) changing by the computer system in response to movement of the user's hand and fingers thereof, at least one of a viewing vantage point and orientation from which the virtual environment is displayed to the user on said display unit; and
(zz) terminating said changing of the virtual environment view and re-displaying said first menu on the display unit by the computer system, when the video gesture recognition subsystem identifies said first hand gesture made by the user.

27. The method of claim 1, wherein the virtual environment comprises a plurality of peripheral boundary surfaces enclosing at least a portion of the virtual environment, displayed by the display unit, further comprising the step of:
(aaa) displaying on at least a portion of said plural boundary surfaces, by the display unit, a shadow generated by the computer system for each of said first and said second gripping elements, so as to enable the user to visually assess a position of said first and said second gripping elements with respect to said plural boundary surfaces.

28. The method of claim 1, wherein said first finger of the user's hand is an index finger and wherein said second finger of the user's hand is a thumb.

29. The method of claim 5, wherein said first hand gesture comprises an open-handed reaching gesture.

30. The method of claim 5, wherein said second hand gesture comprises a pointing gesture, and wherein said predefined finger is an index finger.

31. A system for manipulating a virtual object in a three dimensional virtual environment, comprising:

display means for displaying the virtual environment to a user;

video gesture recognition means for identifying predetermined hand gestures and movements made by the user's hand within a predefined identification zone; and control means, connected to said display means and said video gesture recognition means, for:

(1) generating, for display by said display means in the virtual environment, a first gripper element having a first end portion and a second gripper element having a second end portion for display on the display unit in the virtual environment, wherein said first and second gripper elements are positioned in substantially parallel relation to align said first and said second end portions with one another, wherein said first gripper element corresponds to and is operatively moved and oriented in accordance with a first finger of the user's hand, wherein said second gripper element corresponds to and is operatively moved and oriented in accordance with a second finger of the user's hand, wherein said first and second grippers are moved in accordance with movement of the user's hand within the identification zone, and wherein said first gripper element is moved with respect to said second gripper element corresponding to movement of the user's first finger with respect to the user's second finger;

(2) enabling the user to grasp, by user movement of the user's first and second fingers, the virtual object by aligning said first and second gripper elements with the virtual object and moving said first and second gripper elements into proximity with one another until said first and said second end portions intersect with the virtual object; and (3) enabling the user to manipulate, by user movement of the user's hand and the user's first and second fingers, the grasped virtual object by moving the user's hand and said first and second fingers within said predefined identification zone while maintaining contact between said first and said second ends and the virtual object.

* * * * *